INVENTOR.
GERRIT JAN LANSINK
BY
Frank R. Jifri
AGENT

INVENTOR.
GERRIT JAN LANSINK
BY
Frank R. Trifari
AGENT

Aug. 6, 1968 G. J. LANSINK 3,396,292

CIRCUIT ARRANGEMENT FOR FEEDING ELECTRICAL APPARATUS BY WAY OF A TRANSISTOR CIRCUIT

Filed March 4, 1965 3 Sheets-Sheet 3

INVENTOR.
GERRIT JAN LANSINK

United States Patent Office 3,396,292

Patented Aug. 6, 1968

3,396,292

CIRCUIT ARRANGEMENT FOR FEEDING ELECTRICAL APPARATUS BY WAY OF A TRANSISTOR CIRCUIT

Gerrit Jan Lansink, Enschede, Netherlands, assignor to N.V. Hollandse Signaalapparaten, Hengelo, Netherlands, a firm Filed Mar. 4, 1965, Ser. No. 437,194
Claims priority, application Netherlands, Mar. 6, 1964, 6402259
4 Claims. (Cl. 307—202)

ABSTRACT OF THE DISCLOSURE

A circuit for the protection of a load supplied by a constant current source using a first transistor having its collector-emitter path connected in series with a load and showing an increase in base current in response to load voltages increasing above a normal level. A bistable trigger responds to the increase in base current of the first transistor by reversing its state, forward biasing a second transistor having its collector-emitter path connected as a shunt across the constant current source, thereby preventing source currents from reaching the load. The low impedance path provided by the second transistor in response to rising load voltages prevents the source from generating abnormally high voltages.

The invention relates to a circuit arrangement for feeding electrical apparatus by way of a transistor circuit. The transistor circuit may, for instance, be a switching arrangement with transistor switches which can cause the current to flow either in the one or in the other direction through the electrical apparatus, or which can lead the current to a selected one of different parts of the electrical apparatus, or can lead the current to a selected one out of a number of different electrical apparatuses. As a result of a fault in such apparatus the circuit in which the current passes through the (selected) apparatus may obtain an abnormally high resistance or may even be interrupted. This may lead to serious damage to the transistors in the transistor circuit. As a rule, the current supply in a circuit has a certain amount of internal resistance. An interruption or a substantial reduction in the intensity of the current will then result in a substantial change in the voltage distribution in the circuit through which the current is supplied. This may give rise to inadmissible potential differences between certain electrodes of transistors in the transistor circuit, for, as a rule, the potential of at least one of the electrodes of such a transistor remains within a fairly narrow range. Such potential differences destroy the transistors within a very short interval. Such an interruption or rise in resistance of the circuit in the apparatus to be fed is especially dangerous if the current is supplied by a source of constant current, because such a source endeavours to feed a current of unvarying strength into the transistor circuit independently of the change in resistance or of the circuit interruption. This current cannot pass, or at any rate cannot pass completely, through the electrical apparatus, and tries to find alternative routes. This will result in a substantial part of the current flowing through the base-circuit of various transistors in the transistor circuit, causing serious overloading of these base-circuits and resulting in immediate destruction of the transistors. It is the object of the invention to prevent damage to the transistors in the transistor circuits by substantial reduction in or even reduction to zero of the current fed into the transistor circuit when faults of the type described above arise in the electrical apparatus. For this purpose, according to the invention, the circuit-arrangement is built in such a way that a first control input circuit of a bi-stable trigger circuit belonging to the circuit-arrangement and provided with two control input circuits through each of which the trigger circuit can be triggered into a corresponding one of the two stable states, is connected by way of a protection circuit to the base circuit of at least one of the transistors through which current is supplied in the transistor circuit to the electrical apparatus. When the current in such a base circuit exceeds a predetermined value, this protection circuit supplies a voltage of such a direction and amplitude to the said control input circuit that the bi-stable trigger circuit is triggered into the stable state which hereinafter will be referred to as the first state. In this state the trigger applies a control voltage to a control device for the current supplied to the transistor circuit for the purpose of feeding the electrical apparatus, that causes this device to reduce said transistor circuit current to zero or at least to a small value.

The reduction of the current can be achieved in various ways. It can be effected, for instance, by means of an electronic switch which breaks the current supply to the transistor circuit under the control of the trigger circuit, but in this case the electronic switch must be able to carry the voltages which will be applied to it as a result of the current interruption, and for this reason the said electronic switch will, as a rule, have to be an electron tube, for the fact that the protective measures described above are necessary shows that relatively high voltages may be expected.

In another embodiment according to the invention the control device consists of a transistor switch which is controlled by the bi-stable trigger circuit in its first state to establish a connection with low resistance between the current supply input circuit of the transistor circuit and a point having a fixed potential, the application of which to said input circuit will not damage the transistor circuit and will reduce the current in the apparatus to be fed to zero or at any rate to a low value. This embodiment is simple and has the advantage that it reacts very rapidly. It can, moreover, be applied when the current is supplied by a source of constant current, because, once the protesting arrangement has become operative, the said current can flow through said switch with low resistance.

A third embodiment of the arrangement according to the invention can only be applied if the current is supplied by a source of constant current. In this embodiment the control device for the current to be applied to the electrical apparatus to be fed is a circuit comprised in the said source for constant current, which controls the intensity of the constant current supplied by the source, depending on the voltage applied to it, said circuit controlling at least a substantial decrease in said current when it receives the voltage applied to it by the trigger circuit as a result of the fact that this trigger circuit is in its first or reset state.

As a rule, an arrangement of the type described above should comprise means for switching-on and switching-off the current supply to the electrical apparatus. Similar means or even the same means may be applied for this purpose as those which, should the resistance in the electrical apparatus become too high, reduce the current supplied to the transistor circuit either to a low value or completely to zero. In a certain embodiment of the arrangement according to the invention the bi-stable trigger circuit can be controlled by a switching-in or a switching-out signal in order to cause current to be supplied to or removed from the electrical apparatus. The switching-in signal may be a voltage which is applied, for instance by way of a differentiating network, to the second control input circuit of the bi-stable trigger circuit, causing it to be switched over to its second state, in which state it does not prevent the current supply to the electrical apparatus, while the switching-out signal is a voltage which is applied, for instance by way of an "or" circuit to which the protecting circuit is also connected, to the first control input circuit of the trigger circuit.

In another arrangement in which the current supply to the electrical apparatus can be controlled, the voltage which constitutes the switching-in signal and the voltage supplied by the bi-stable trigger circuit control through a coincidence gate, the control device for the current supplied to the transistor circuit. The switching-in signal is able to operate the control element only if the trigger circuit supplies a voltage which corresponds to its second state. The trigger may be switched to its second state by a voltage supplied to its second control input circuit as a result of the operation of a manually operated element. In this connection a coincidence gate is defined as any circuit which will only let a control voltage pass if a predetermined combination of voltages having values within predetermined ranges is applied to its input circuits. Apart from the well-known "and" and "or" circuits with diodes, gate circuits with electron tubes or transistors may also be applied for this purpose.

A characteristic example of an arrangement according to the invention is a circuit arrangement in which various windings of the magnetic heads of a magnetic drum storage are fed by way of a transistor circuit which selects the winding to be fed and/or the direction of the current in the winding to be fed, whilst the transistor circuit itself is fed by a source of constant current. In drum storages the magnetic heads are floating on an air cushion between the heads and the drum in order to permit them to effect small movements in connection with irregularities of the drum surface, and as a result of these movements the very thin stranded wires through which these magnetic heads are fed are apt to be disrupted. The invention provides means for protecting the transistors in the transistor circuit for selecting the winding of the head as well as in the transistor circuit for selecting the direction of the current, should such a strand be interrupted.

The invention will now be described, by way of example, by a number of embodiments with reference to the drawings.

Figure 1:
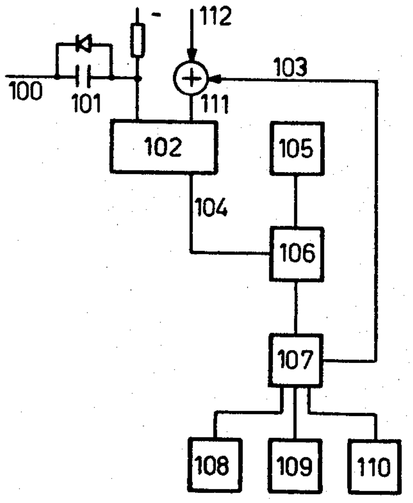
FIGS. 1 and 2 show block diagrams of two arrangements according to the invention.

FIG. 1 shows a block diagram of a first embodiment of an arrangement according to the invention. In this figure 105 is a current source, which may for instance be a source of constant current. Part 107 is a transistor circuit, which in this case is a system of transistor switches through which current can be selectively supplied to one of three electrical apparatuses 108, 109, 110. Part 106 is the control device for the current to be supplied to the selected apparatus. It is assumed that this is an electronic switch which can connect a point in the input circuit of the transistor circuit to a point with a suitable constant potential thereby short-circuiting the selected apparatus. For the purpose of controlling the supply of current to the selected apparatus this control device is itself controlled by a bi-stable trigger circuit 102. Only if this trigger circuit is in its set state in which it supplies a certain voltage that blocks the electronic switch 106 by way of its output circuit 104, will current be supplied to one of the apparatuses 108, 109, or 110. If the trigger circuit is in its other state, which hereinafter will be referred to as the reset state, then the voltage supplied by output circuit 104 makes the electronic switch conductive, short-circuiting the source and reducing the current in the selected device substantially to zero. The trigger circuit 102 has two control input circuits. The control signal which is to start the current supply to an electrical apparatus is applied to the left control input circuit. This control signal consists of a voltage which is applied to the conductor 100, and is differentiated by a condenser 101. The pulse resulting from the application of the control signal sets the trigger circuit 102, causing it to supply a voltage to the circuit 104, which permits the supply of current to flow to the selected electrical apparatus. If the arrangement is in good order no further switching operations result from the reception of the control signal and the supply of current to the selected apparatus. Should, however, the electrical circuit in the selected electrical apparatus be interrupted, then the base current of at least one transistor in the transistor circuit 107 through which current is supplied to a selected electrical apparatus such as 108, becomes too high, causing a voltage across a resistance through which said base current flows to become too high. This voltage is applied by way of circuit 103, which constitutes the protecting circuit and passes through an "or" circuit 111 to the second control input circuit of the trigger circuit. If necessary, the protecting circuit comprises amplifiers for the voltage applied to it, circuit arrangements for electrically separating electrical circuits, such as "and" or "or" circuits, means for impedance matching, and/or means for changing the voltage level. A voltage which thus reaches the said control input circuit immediately resets the trigger circuit 102, so that the voltage at the output circuit 104 obtains a value which causes the switch in the control device 106 to become conductive, substantially reducing the current supplied to the electrical apparatus. The trigger circuit 102 is of a type which reacts very rapidly, so that the current in the transistor circuit 107 is reduced so rapidly that the transistors in the transistor circuit are not damaged. Should another switching-in signal be received at the input circuit 100, then the series of switching operations described above is repeated. This is not a drawback in the system described. It cannot be denied that each switching-in signal results in an excessive voltage being applied to the transistor switch through which the current must be supplied, but the overload resulting therefrom prevails only for such a very short time interval, that no transistor will ever be damaged by it. The circuit arrangement described above has the advantage that it is ready for use at any moment. Consequently, if only one of the electrical apparatuses is damaged another apparatus may be selected and fed without special measures, for even if one of the apparatuses shows a defect which caused the resetting of the trigger circuit after this device was selected to be fed, each switching-in signal can set the trigger circuit again causing it to control the supply of current to one of the other devices, and if the electric apparatus selected is in an undamaged state, then the trigger circuit will remain in its set state and a current supply will be maintained. The fact that one of the not-selected devices is damaged does not influence the said current supply. When the current through the selected apparatus is to be interrupted or at any rate to be reduced to a very small strength, then a voltage pulse is applied to the input circuit 112 of the "or" circuit 111. This pulse reaches the right hand control input circuit of the trigger circuit 102 by way of the "or" circuit, so that the trigger circuit is reset and the electronic switch in the control device is biassed to halt current supply to the selected apparatus.

Figure 2:
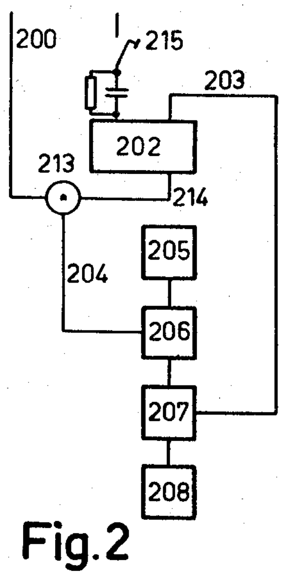

The circuit arrangement shown in FIG. 2 operates according to another principle. This circuit definitely prevents the current from being supplied once a defect in an electrical apparatus has been established. Consequently this circuit arrangement is more suitable if only one electrical apparatus to be fed is present, and if the transistor circuit is applied, for instance to reverse the current in the said electrical apparatus. In FIG. 2 part 205 is the source of constant current. Part 206 is the control device for the current supplied to the electrical apparatus and is controlled by way of the circuit 204, while part 207 is the transistor circuit, which in this case is assumed to have for object the reversal of the current in the only electrical apparatus 208 present in the arrangement. The switching-in signal is constituted by a voltage applied to the input circuit 200, which voltage is maintained as long as current is to be supplied to the electrical apparatus. The said voltage is applied to a coincidence gate 213 which can only pass this switching-in signal to the circuit 204 if the second input circuit 214 of the coincidence gate has a corresponding voltage applied to it. The voltage applied to the input circuit 214 is supplied by a bi-stable trigger circuit 202, and will have the value suitable for permitting the coincidence gate to allow the switching-in signal to pass if the trigger circuit 202 has been set by means of a manually controlled switching arrangement, such as a press button 215. The trigger circuit remains in this state as long as no defect has been established, and consequently the switching in signals can reach the control device 206 and control the current supply to the electrical apparatus 208 as long as the apparatus to be fed is in good order. If, however, a defect develops in the electrical apparatus 208, as a result of which the resistance in the circuit through said apparatus becomes high or the said circuit is completely interrupted, then a transistor in the transistor circuit 207, through which current is supplied to the apparatus 208, may obtain too high a base current. In this circuit arrangement also, the base current flows through a resistance, and the voltage across this resistance is applied to reset the trigger circuit 202 by way of a protection circuit 203. In its reset state the trigger circuit applies such a voltage to the circuit 214 that the switching-in signal applied to the circuit 200 will no longer reach the control device 206. An existing switching-in signal is made inoperative in this way, causing the current supply to the transistor circuit 207 to be reduced to zero, or at any rate to a very small strength. A new switching-in signal will, under these circumstances, be unable to pass the coincidence gate and will have no influence. The occurrence of the defect may be signalled in one way or another. It would be possible for an alarm signal, such as a gas discharge-tube to be controlled by the trigger circuit 202. In consequence of the observation of this signal, the damaged electrical apparatus 208 may be either replaced or repaired and when this has been effected the manually controlled switching arrangement 215 may be operated in order to switch the trigger circuit 202 over to the state in which it again permits the passage of the switching-in signals. It is an advantage of this circuit arrangement that after a defect has been established, current will no longer be supplied to the electrical device, but it is a disadvantage that other apparatuses, fed by way of the same transistor circuit, will definitely be made inoperative.

An arrangement according to the invention will now be discussed in greater detail with reference to FIGURE 3. In this figure certain parts, which correspond to parts shown in FIG. 1, are designated by the same reference numbers, in this case, however, in parantheses. A source for constant current (105) is shown on the upper left hand side of the figure. The current supplied by this source is kept constant by means of a transistor 305. The point 316 has a predetermined fixed potential which is designated by +. The current flows from this point 316 through an adjustable resistance 318 to the emitter of the control transistor 305. The base of this transistor has a fixed voltage with respect to the potential applied to the point 316 because the said base is connected to the point 316 by way of a Zener diode 317 and by way of a resistance 319 to a point with a fixed potential $-b$. It is to be noted that apart from the positive voltage designated by + a number of negative voltages are also applied to the system, which are designated by $-a$, $-b$, $-d$, $-e$. The absolute values of these voltages satisfy the equation $a<b<d<e$. The transistor 305 will maintain the current supplied by the source at such a value that the voltage across the adjustable resistance 318 will remain approximately equal to the constant voltage across the Zener diode 317. Consequently the current suppled by the source remains approximately constant. Part (106) is the control device for the current. This control device consists of a switching transistor 306, which, in its conductive state, establishes a connection with low resistance between the output circuit of the source for constant current and a point with a negative potential $-a$, and in this way derives the current from the electrical apparatus to be fed and the transistor circuit through which this apparatus is fed. As long as the transistor in the control element is conductive, the electrical apparatus to be fed receives no or at any rate no more than a very small current. Moreover, the input circuit 356, through which the transistor circuit is fed, receives a potential of about $-a$ which will not damage the transistors in the transistor circuit as long as the other voltages supplied to this transitor circuit are within their normal ranges. Only if the transistor 306 is blocked will current be supplied by the current source (105) to the apparatus to be fed. The transistor is controlled by a trigger circuit 302 (102). This trigger circuit is set by applying a voltage to the input circuit 300. This voltage is differentiated by a condenser 301, so that, as a result of the application of the voltage as well as of the removal of the voltage, a pulse will be supplied to the left hand input circuit of the trigger circuit 302. This pulse is superposed on a quiescent potential which is determined in the first place by the fact that the left hand control input circuit of the trigger circuit is connected by way of a resistor 321 to a point with the potential $-a$. Only the pulse generated by differentiation at the application of the voltage to the circuit 300 will switch over the trigger circuit 302 and actually set it. In the set state the voltage at the output circuit 314 is reduced and this voltage reduction is passed to the base of the switching transistor 306 by the voltage divider 322, 324, as a result of which, this switching transistor is blocked. Consequently full current is supplied to the electrical apparatus to be fed. Current is removed from the apparatus to be fed by applying a positive voltage or a positive pulse to the circuit 312, which voltage or pulse reaches the right hand control input circuit of the trigger circuit 301 by way of "or" circuit 311, causing the trigger circuit to be reset. In its reset state the voltage supplied by the output circuit 314 regains its quiescent value, which is higher than the value supplied in the set state. As a result of this voltage increase the potential of the base of the switching transistor 306 is also increased, so that this switching transistor becomes conductive causing the current to be removed from the device to be fed. It will be readily understood that the apparatus to be fed receives current as long as the trigger circuit 302 is in its set state, and receives no current or at any rate a very small current if the trigger circuit 302 is in its reset state. Consequently the current supply to the electrical apparatus can be controlled by applying voltages to the input circuits 300 and 312 of the trigger circuit.

It is sometimes necessary for the current to flow selectively in the one or in the other direction through the apparatus to be fed, and for this reason the current supplied to the apparatus flows through a transistor circuit with a number of transistors. This transistor circuit might be damaged when the connection through the electrical apparatus is interrupted or obtains a very high resistance. The electronic switching arrangement in the transistor circuit comprises among other things the switching transistors 346, 347, 352 and 353 and is shown, together with the electrical apparatus 308 to be fed, under the dotted line in FIG. 3. The said switching transistors are controlled in such a way that in no case are more than two of them conductive and that these conductive transistors are always arranged diagonally such as the transistors 346 and 353. The current supplied by the current source (105) flows through a resistance 320, the object of which is to promote a suitable voltage distribution, and through the conductor 356 to that one of the two transistors 346 and 347 which, at that moment, is conductive, and then through the electrical apparatus 308 to be fed. It flows from left to right in this apparatus when the switching transistor 346 is conductive, and from right to left when the switching transistor 347 is conductive. Having passed the apparatus to be fed, the current flows through one of two switching transistors 352 or 353, and by way of the conductor 357, to a point with a negative potential $-d$. Pulse voltages are applied to the input circuits 342 and 343. The pulses applied to these circuits have the same length as the pulse intervals, and are in phase opposition. The voltage applied to the input circuit 342 passes a protecting resistance 340, which is bridged by a small condenser in order to promote low reaction times, and reaches the base of an emitter follower 344. This emitter follower applies a reproduction of the pulse voltages applied to the input circuit 342 to the base of the switching transistor 346. The voltage levels are arranged in such a way, that for the usual voltage distribution in the current supply circuit the switching transistor 346 will be conductive when the applied voltage has its lowest value and is blocked when the applied voltage has its highest value. The said pulse voltages are also applied, by way of a second protecting resistance 358 which is bridged by a small condenser in order to promote a high reaction speed, to the base of an amplifier transistor 354. Amplification is indispensable in this case because in connection with the voltage distribution in the current supply circuit, a higher voltage is required for blocking the transistor 352 than for blocking the transistor 346. Across its collector resistance 350, the transistor 354 supplies an amplified voltage to the base of the switching transistor 352. The amplifier 354, moreover, operates as a phase reversing network, so that the base of the switching transistor 352 obtains its lowest voltage at the moment at which the base of the transistor 346 obtains its highest voltage. Moreover, the voltage levels are arranged in such a way that, for the usual voltage distribution in the current supply circuit, the switching transistor 352 is conductive when its base voltage has the lowest of the two possible values and is blocked when this base voltage has the highest of these values. Consequently the pulse voltage applied to circuit 342 will cause the transistor 352 to be conductive and the switching transistor 346 to be blocked simultaneously when it has its highest value and will cause the switching transistor 352 to be blocked and the transistor 346 to be conductive when it has its lowest value. The right hand side of the circuit operates in completely the same way. A pulse voltage is applied by way of a protecting resistance 341 to the base of the emitter follower 345, which, therefore supplies, across its emitter resistance 349 a reproduction of the applied voltages to the base of the switching transistor 347, as a result of which the switching transistor 347 alternately becomes conductive and blocked, whilst the same pulse voltage is applied by way of a protecting resistance 359 to the base of the amplifier transistor 355, which also operates as a phase reverser and applies the amplified voltage present across its collector resistance 351 to the base of the switching transistor 353, with the result that this transistor also becomes alternately conductive and blocked. In this case also, as the result of the phase reversal in the amplifier-transistor 355, the two switching transistors 347 and 353 will never be conductive at the same moment. Because the pulses with the highest voltage applied to the input circuit 342 are situated in the pulse intervals of the pulse voltages applied to the point 343, the switching transistors 346 and 347 will never be conductive at the same moment. Consequently only the two states enumerated below will be possible:

(a) The voltage applied to the input circuit 342 has its lowest value while during the same interval the voltage applied to the circuit 343 has its highest value, with the result that the transistors 346 and 353 are conductive when the transistors 347 and 352 are blocked. The current in the apparatus 308 to be fed flows from left to right in the figure.

(b) The voltage applied to the input circuit 342 has its highest value while during the same interval the voltage applied to the circuit 343 has its lowest value, with the result that the transistors 347 and 352 are conductive when the transistors 346 and 353 are blocked. The current flows from right to left through the apparatus 308.

Consequently the transistor circuit is able to reverse the current in the apparatus 308 to be fed. It is to be noted that under no circumstances are all four transistors blocked, and that the condition whereby all these transistors are blocked should never occur, because then there would be no circuit available for the current supplied by the source for constant current. The occurrence of this condition is, however, prevented by the shape of the voltage pulses applied to the circuits 342 and 343.

The result of an interruption or a substantial resistance increase of the circuit through the apparatus 308 will now be discussed. Under these circumstances no suitable circuit is available for the current supplied by the source for constant current (105), and after having passed one of the upper switching transistors this current will find its way blocked through the apparatus to be fed as well through the lower switching transistor located at the same side of the circuit. The current source endeavours, however, to maintain the current supplied by it at its full strength, and for this reason the current seeks the path of least resistance, which in this case is the base circuit of that one of the two upper switching transistors 346 and 347 which is at that moment conductive. The current then flows on, by way of the emitter follower 344 or 345 and the resistance 338 or 339, and back to a point with the negative voltage $-b$. Under normal circumstances the collector voltage of the emitter follower 344 or 345 remains within a fairly narrow range determined by the voltage loss in the collector resistance 338 or 339. The current, which arises in this circuit as a result of the defect of the apparatus to be fed, has such a value, however, that the voltage applied to the conductor 336 or 337 differs substantially in the positive sense from its quiescent value range. Consequently one of the threshold diodes 334 or 335 will become conductive, so that the emitter voltage of one of the amplifier transistors 330 or 331 will be increased. The two amplifier transistors 330 and 331 have collector resistances 326 or 329. A substantially increased voltage will appear across the collector resistance of that amplifier transistor, to which an increased voltage is applied. The increased voltage is applied by way of an "or" circuit consisting of the diodes 327 and 328 and the resistance 325 to the conductor 303, and through a second "or" circuit 311 to the right hand control input circuit of the trigger circuit 302, which will be reset by this voltage. The resetting of the trigger circuit results in an increase of the voltage supplied by the right hand output circuit of the trigger circuit and of the base voltage of the switching transistor in the control element (106) for the current supplied to the electrical apparatus. Consequently this transistor becomes conductive, and establishes a low resistance path for the current which was to be supplied to the electrical apparatus 308. Because transistors are quickly damaged by overload it is desirable for the safety measures described to be taken as soon as possible. For this reason, the trigger circuit 302 is of a type which reacts very rapidly. Moreover, the upper resistance of the voltage divider 322, 324 is bridged by a small condenser 323. On the other hand the protection circuit must be prevented from reacting to each peak voltage resulting from switching operation. Such peak voltages may be transistory phenomena resulting from the application of pulse voltages to the input circuits 342 and 343, and for this reason the collector resistances 338 and 339 of the emitter followers 344 and 345 are bridged by small condensers.

Figure 3:
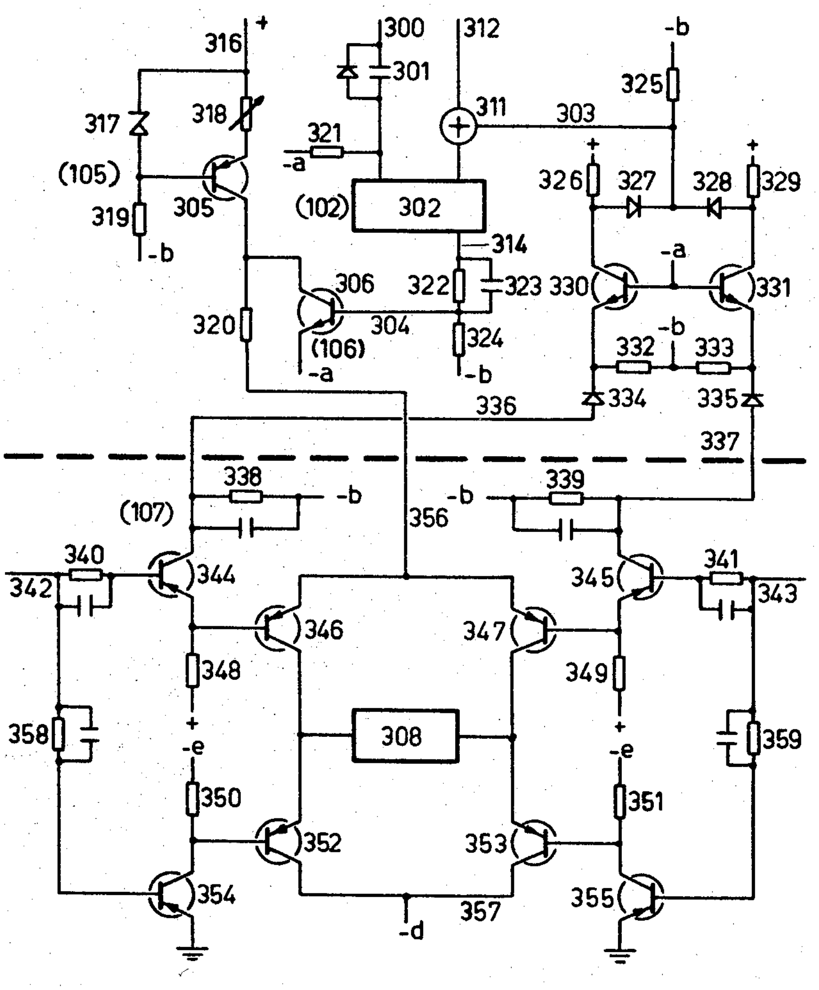
FIGS. 3 and 4 show circuits of arrangements according to the invention in greater detail.
Figure 4:
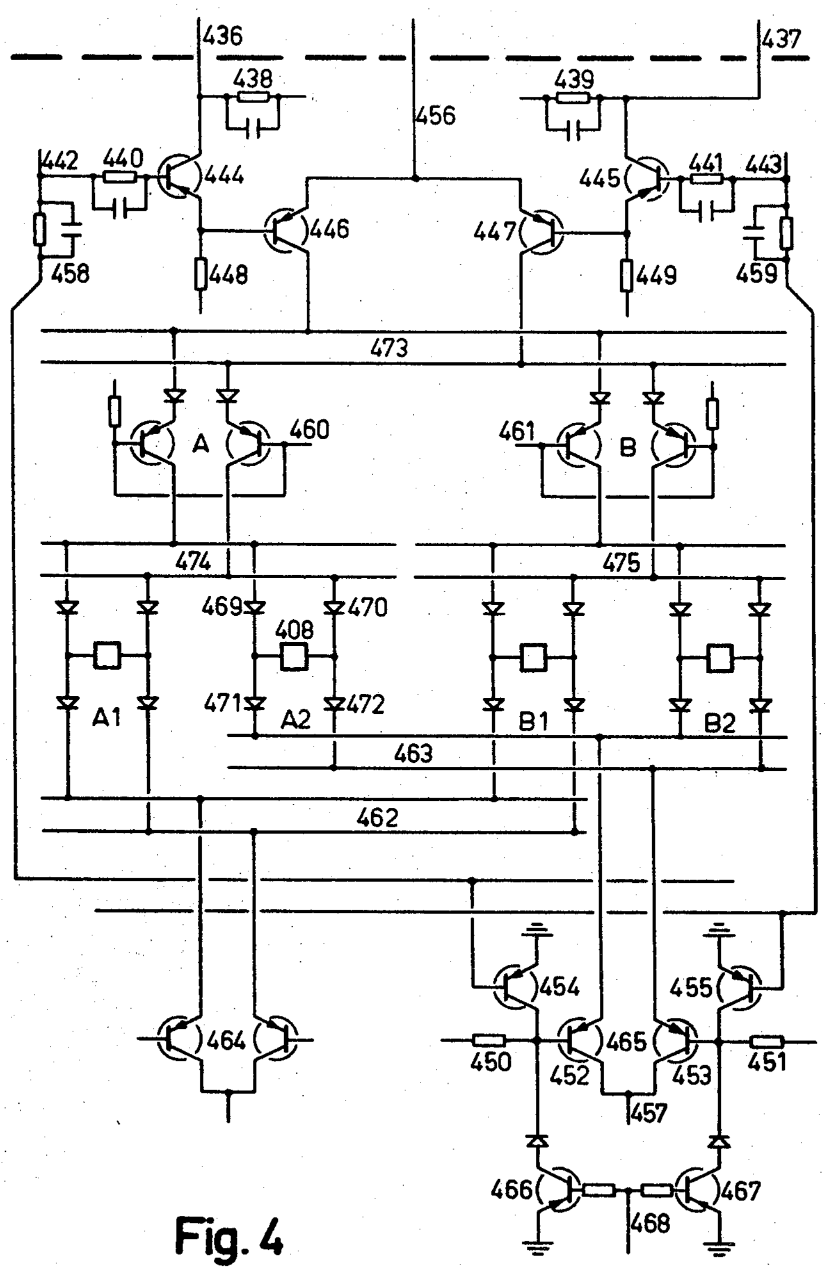

FIG. 4 shows that similar protecting measures may also be applied when the transistor circuit is used for selecting one out of a number of electrical apparatuses as well as for reversing current in a selected apparatus. This figure is to be combined with the part of FIG. 3 situated above the dotted line. In principle the part of the circuit which causes the current reversals operates exactly in the same way as the circuit according to FIG. 3. In this connection the last two figures of the reference numbers relating to corresponding elements and circuits in the said parts of FIGS. 3 and 4 are the same, and the operation of this part of the circuit of FIG. 4 may be understood by reading the description of FIG. 3, provided that only the last two figures of the reference numbers are taken into account. The upper part of FIG. 4 shows two switching transistors (446 and 447) for reversing the current direction that correspond to the upper two switching transistors 346, 347 in FIG. 3. These switching transistors are common to the complete arrangement. It would be possible to build an arrangement in which the second set of switching transistors, corresponding to the switching transistors 352, 353, would also be common to all electrical apparatuses which can be fed by way of the arrangement. In the embodiment shown preference has been given, however, to an arrangement in which said transistors partake in the selection of the apparatus to be fed. In connection therewith all electrical apparatuses are arranged in groups, and a pair of transistors for reversing the current is allotted to each one of these groups. The transistors of all these pairs of transistors receive the controlling pulse voltages applied to the common pair of transistors 446, 447, but said control voltages are only effective for forward and reverse biasing the transistor switches in a pair of transistors which has been selected by a selection voltage.

The lower part of FIG. 4 shows the switching means which effect the selection of the electrical apparatus to be fed and permit current to be supplied thereto by the current source. The electrical apparatuses are arranged in a matrix circuit. Only four of such apparatuses are shown in the figure, but it will be readily understood that the number of apparatuses from which a selection can be made may be substantially greater if the number of lines and columns in the matrix is increased. The selection is effected by means of transistor switches which are blocked in the quiescent state by the application of suitable base voltages, but a certain combination of which can be made conductive by the application of another base voltage for the purpose of selecting a certain apparatus. If no more than four electrical apparatuses are present the arrangement in a matrix has no advantage but if the number of apparatuses is greater than the matrix as selection means leads to a reduction in the amount of switching means required.

Depending on the pulse voltage applied at a certain moment, either the transistor 446 or the transistor 447 is conductive, and the current supplied by the current source is supplied either to the upper- or to the lower conductor in the pair of conductors 473. The apparatuses $A_1$, $A_2$, $B_1$ and $B_2$ to be fed are arranged in two groups of two. Each of these groups can be fed by way of a pair of conductors 474 and 475. Each of these pairs of conductors 474, etc., is connected by way of a pair of switching transistors, such as A or B, to the pair of conductors 473. By applying a forward biasing voltage to a part of the selection circuit, 460, 461, a connection can be established either by the pair of transistors A between the pair of conductors 473 and the pair of conductors 474 or by the pair of transistors B between the pair of conductors 475 and the pair of conductors 473. If the pair of transistors A is conductive and the pair of transistors B is blocked, it is impossible to feed the electrical apparatuses B1 or B2, and a selection is only possible between the electrical apparatuses belonging to the pair A1 and A2. The remaining part of the selection is effected by selecting either all left hand apparatuses or all right hand apparatuses. The circuitry effecting this selection is shown in detail only for the right hand apparatuses. The circuits through which these right hand apparatuses can be fed pass through a pair of conductors 463 to a pair of switching transistors 465. These transistors 465 aid in the selection of the right hand apparatuses $A_2$, $B_2$ as well as in the establishment of the direction of the current in the selected apparatus. The transistors 465 serve the same function as the transistor switches 352 and 353 in FIG. 3. Assume that the pair of transistors 465 has been selected for establishing the connection. Under this condition only the electrical apparatus A2 can be fed. The apparatus B2 cannot be fed because the pair of transistors B is blocked. The apparatuses A1 and B1, that are the left hand apparatuses cannot be fed because the relative circuits are blocked in the pair of transistors 464. The current supply to and from each apparatus is effected by way of four diodes associated with each apparatus. The diodes belonging to the apparatus A2 are designated by the reference numbers 469, 470, 471 and 472. These diodes are necessary to preventing the current from flowing to non-selected apparatuses. The blocking action of theses diodes can be established by trial and error.

The switching transistors 465 are controlled by changing their base voltage. This base voltage can be influenced by selection measures. As long as the selection voltage applied to the conductor 468 is low enough, the two amplifier transistors 466 and 467 are conductive. The current through transistors 466 and 467 increase the base potentials of switching transistors 465 to such an extent, that it is impossible for these transistors to become conductive. If the potential applied to the selection wire 468 is above a certain limit, however, the collector circuits of the transistors 466 and 467 have no further influence on the voltage of the base circuits of the switching transistors 465, and are no longer able to increase the base voltages of these transistors. Consequently the pulse voltages applied to the input circuits 442 and 443 controls the switching transistors 446 and 447 also controls the switching transistors 465, making them alternately conductive. This way of controlling the transistors 452 and 453 is exactly the same as the way described above with reference to FIG. 3 in connection with the transistors 352 and 353. It is, however, only possible to control the said pair of switching transistors if it has been selected by applying a predetermined potential to a selection conductor such as 468.

The circuit according to FIG. 4 has only been described in order to show that the protection measures according to the invention can also be applied to more complicated transistor circuits. A complete description of the operation of the system according to FIG. 4 is, however, superfluous, because it is no part of the invention. It suffices to establish that an interruption of the circuit in the selected apparatus will cause the current supplied by the current source to flow through the base circuits of the transistors 446 and 447. As described with reference to FIG. 3, the potential of at least one of the conductors 436 and 437 is increased, initiating the protection measures described with reference to FIG. 3 through one of the conductors 336 and 337, one of the threshold diodes 334 and 335 and one of the transistors 330 and 331.

It will be readily understood that a protection arrangement according to the invention is especially important if the current is supplied by a source for constant current. If the current is supplied by such a source to a circuit which is interrupted, or the resistance of which is substantially increased, the said source will attempt to maintain, by automatic regulation, the current on its predetermined value, and this will result in substantial voltage changes, which may damage or destroy the transistors in the transistor circuit. Similar phenomena will, however, result if the current is supplied by a source of constant voltage through a supply circuit with a non-negligible internal resistance. The interruption or reduction of the current in the apparatus fed by this source will cause the voltage loss in the resistance in the supply circuit to be reduced and the potentials of the electrodes of certain transistors connected to the supply circuit will be changed beyond the range allotted to the voltages applied to other electrodes of the said transistors. In this case the potential differences between certain electrodes will become too high, resulting in the destruction of these transistors if no suitable measures are taken. It will, moreover, be readily understood, that the protective circuit of the type described above also becomes operative if a resistance increase or a current interruption occurs outside the apparatus to be fed but within the transistor circuit through which this apparatus is fed.

In the embodiment discussed above an interruption of the current in the transistor circuit can also result if the pulse voltages applied to the conductor 342, FIG. 3 are not a perfect inversion of the pulse voltages applied to the conductor 343 in the said figure. It may then happen that either the two transistors 346 and 347 or the two transistors 352 and 353 are simultaneously blocked. This type of current interruption may result in the application of voltages which are too high for the transistors, but, as a rule, in this case also the circuit arrangement according to the invention will be able to prevent damage to the transistors in the way described above.

What I claim is:

1. A protection circuit for a load safely operable at or below a normal operating voltage and supplied by a constant current source connected in series with said load, comprising sensing means coupled to said load for providing an overload signal in response to load voltages rising above said normal levels, a bistable trigger coupled to said sensing means and triggerable from a first state to a second state in response to said overload signal from said sensing means, and a bias controlled switch means connected across said source and coupled to said trigger for providing a high impedance current path across said source in response to said first state of said trigger, thereby permitting substantially all said source current to flow through said load, said switch responsive to said second state of said trigger for providing a low impedance current path across said load thereby diverting source current from said load.

2. A protection circuit as claimed in claim 1 wherein said sensing means comprises a transistor having base, collector and emitter terminals, said collector and emitter terminals of said first transistor defining a collector-emitter path, said base and emitter terminals of said first transistor defining a base-emitter path, said collector-emitter path of said first transistor connected in series between said source and said load forming a conduction path, said base-emitter path of said first transistor connected in an alternate conduction path across said load responsive to load voltages rising above said normal levels for providing said overload signal to said trigger and wherein said overload signal from said sensing means is a high current passing through said alternate conduction path of said transistor.

3. A protection circuit as claimed in claim 2 wherein said switch comprises a further transistor having base, emitter and collector terminals, said collector and emitter terminals of said further transistor connected across said source and said base terminal of said second transistor connected to said trigger.

4. A protection circuit for a load safely operable at or below a normal operating voltage and supplied by a constant current source connected in series with said load, which comprises a first transistor having base, collector and emitter terminals, said collector and emitter terminals of said first transistor defining a collector-emitter path, said base and emitter terminals of said first transistor defining a base-emitter path, said collector-emitter path of said first transistor connected in series with said source forming a conduction path therewith, said base-emitter path of said first transistor included in an alternate conduction path across said load, said base terminal of said first transistor providing a low current in said alternate conduction path in response to load voltages below said normal level and providing a high current in said alternate conduction path in response to load voltages above said normal level, a bias operable second transistor having base, collector and emitter terminals, said collector and emitter terminals of said second transistor providing an impedance path switchable from a high to a low impedance as a function of reverse and forward bias levels on said base terminal of said second transistor, means for connecting said collector-emitter path of said second transistor across said source, and bistable trigger means connected to said base terminal of said second transistor for reverse biasing said second transistor to provide a high impedance path across said source in response to normal-load-voltage-indicating low currents in said alternate conduction path of said first transistor and for switching and maintaining said second transistor forward biased to provide a low impedance path across said source through said collector-emitter path of said second transistor in response to said above normal load-voltage-indicating high currents in said alternate conduction path of said first transistor.

References Cited

UNITED STATES PATENTS

| | | | |
|---|---|---|---|
| 2,909,707 | 10/1959 | Derr et al. | 317—54 |
| 3,122,646 | 2/1964 | Deysher et al. | 317—33 |
| 3,122,697 | 2/1964 | Kauders | 317—33 |
| 3,303,387 | 2/1967 | Springer | 317—33 |

ARTHUR GAUSS, *Primary Examiner.*

H. DIXON, *Assistant Examiner.*